United States Patent [19]

Beaujean

[11] Patent Number: 4,751,602
[45] Date of Patent: Jun. 14, 1988

[54] DEVICE FOR GUIDING AN INFORMATION CARRIER IN TAPE FORM

[75] Inventor: Joseph M. E. Beaujean, Grubbenvorst, Netherlands

[73] Assignee: Docdata N.V., Venlo, Netherlands

[21] Appl. No.: 871,471

[22] Filed: Jun. 6, 1986

[30] Foreign Application Priority Data

Jun. 12, 1985 [NL] Netherlands ............... 8501697

[51] Int. Cl.⁴ ............... G11B 15/60; G11B 23/087
[52] U.S. Cl. ....................... 360/132; 360/90; 226/196; 242/76; 242/198
[58] Field of Search ............ 360/132, 90–96.5; 242/198, 199, 76; 226/196

[56] References Cited

FOREIGN PATENT DOCUMENTS 0026352 4/1981 European Pat. Off. .
0100284 2/1984 European Pat. Off. .
 860869 12/1952 Fed. Rep. of Germany .
3336921 5/1985 Fed. Rep. of Germany .
1499576 11/1966 France .

OTHER PUBLICATIONS

IBM Technical Disclosure Bulletin, vol. 25, No. 4 blz. 2068.
Patents Abstracts of Japan, vol. 3, No. 40 (E-102).

Primary Examiner—Robert S. Tupper
Attorney, Agent, or Firm—Martin Smolowitz

[57] ABSTRACT

Device for guiding an information carrier which is in tape form and moves between two reels. The device is situated in the path of tape transport between the two reels and embodied as a slidable guide member along which the tape is moved with a certain tape tension. The guide member is a non-rotatable sliding member adapted to oscillate in a direction at right angles to the local direction of movement of the tape, with a maximum acceleration which is at least a few times greater than the transverse component of the tape tension divided by the mass of that part of the tape which is affected by the sliding member.

16 Claims, 2 Drawing Sheets

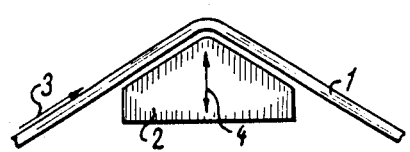
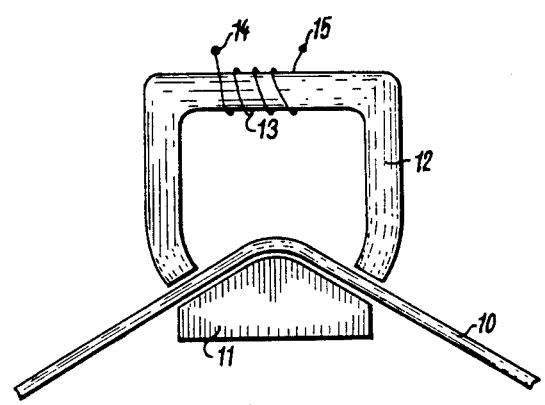
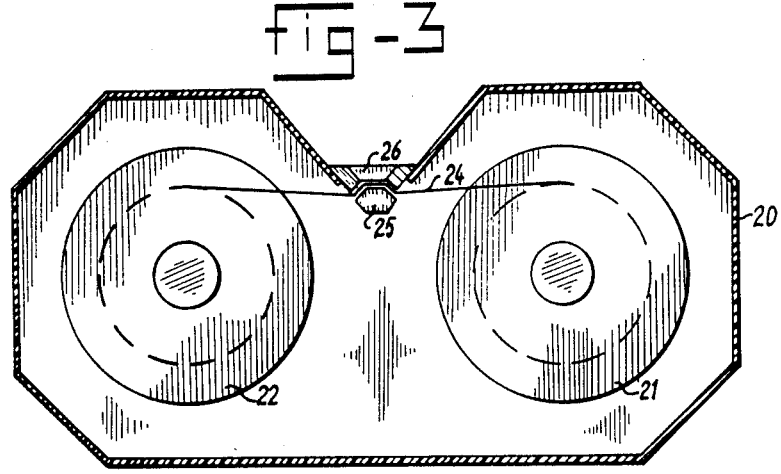

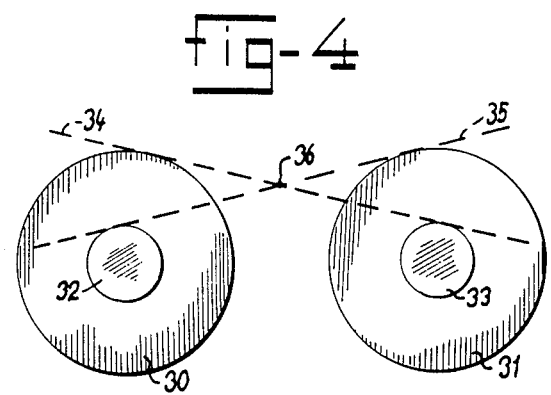
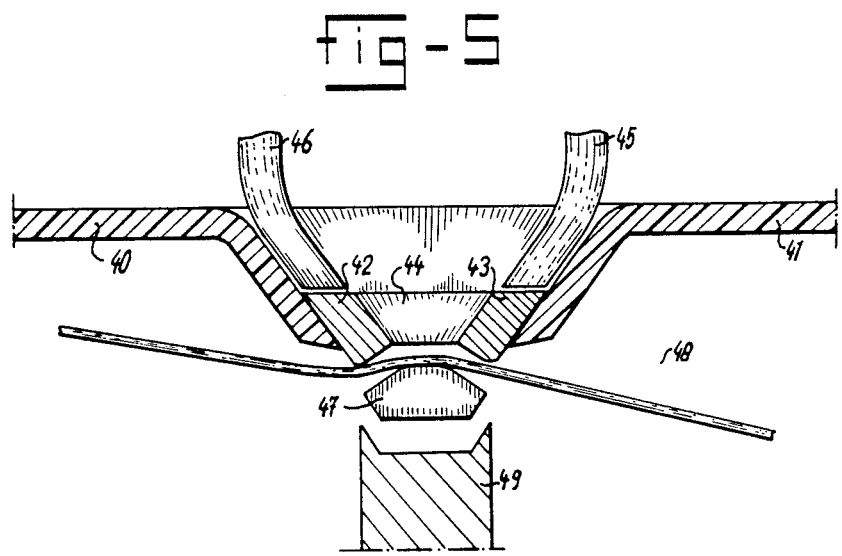

DEVICE FOR GUIDING AN INFORMATION CARRIER IN TAPE FORM

BACKGROUND OF INVENTION

The invention relates to a device for guiding an information carrier which is in tape form and moves between two reels, the device being situated in the path of tape transport between the two reels and is in the form of a guide member along which the tape is moved with a certain tape tension.

A device of this kind is described in Dutch Patent Application No. 7,907,293 as a component of a cassette for a recording carrier in tape form. In this known device, the guide member consists of a cylindrical body which on the one hand is disposed in a fixed position in relation to the cassette, but on the other hand is rotatable about a shaft fastened to the body of the cassette. During the transport of the optical tape from one reel to the other, the tape runs over this rotatable cylindrical body and is at the same time positioned in relation to an optical read/write head, so that by way of a window in the side wall of the cassette light can fall onto that part of the recording carrier tape which at that moment is supported by the cylindrical guide body.

Although the use of a rotatable guide member has the effect that friction between a carrier tape and that member is very slight or completely absent, the use of a rotatable member mounted on a separate shaft, which in turn has to be fastened to the front or rear wall of the cassette, is a serious disadvantage in respect to cost. In devices of this kind it is generally attempted to use the smalles number of moving parts, and in particular as small as possible a number of moving parts which have to be accurately and effectively mounted if the rotation is to take place with the least possible hindrance.

SUMMARY OF INVENTION

The present invention provides a device for guiding an information carrier in tape form which considerably reduces or eliminates these disadvantages, and simplifies still further the construction of a device for guiding and controlling an information carrier tape. In a device of the type defined above, this objective is achieved in that the tape guide member is a non-rotatable sliding member adapted to oscillate in a direction at right angles to the local direction of movement of the tape. The sliding guide member oscillates with a maximum acceleration which is at least a few times greater than the transverse force component of the tape tension divided by the mass of that part of the tape which is affected by the sliding guide member.

A possible explanation is given below for the reduction of sliding resistance observed. Through the oscillatory movement of the sliding guide member in the aforesaid direction at right angles to the local direction of tape movement, the tape is alternately pushed by the sliding member a short distance in one direction against the transverse force component of the tape tension. Also, because of the rapid reverse oscillation of the sliding guide member the tape is then released, and during a certain time period can be transported free from the sliding member until the tape, pulled as the result of the transverse force component of the tape tension in the direction of the sliding guide bar, is once again fully pressed against the sliding member. Thereupon, the sliding member again pushes fully against the tape in the next part of the member oscillation, and so on. On each occasion the sliding member body therefore exxerts its full force on the tape only briefly, so that the friction between the tape and the sliding member is substantially restricted to these short periods. Viewed in time, practically frictionless guidance of the tape is thus achieved.

It is preferable for the above-mentioned number of times by which the maximum acceleration of the sliding guide member is greater than the transverse component of the tape tension, divided by the aforesaid mass, to be greater than five, and in particular greater than ten. Because of this relatively great difference between the maximum acceleration and the transverse component of the tape tension, contact between the guide member and the tape, whereby some force is mutually exerted, is greatly reduced.

It is preferable for the mass of the sliding guide member and the maximum acceleration and frequency of the oscillatory movement to be so selected that the maximum deflection of the sliding member between the two end positions of the oscillatory movement will be smaller than 5 $\mu$m, and preferably smaller than 1 $\mu$m. Therewith the defined speed at which the tape is usually transported along a predetermined position, for example the place where the information is written on or read from the tape, is not affected to any significant extent by the movement of the guide member.

In the above-mentioned Dutch Patent Application No. 7,907,293, the guide member as already stated is situated directly in front of a window for the passage of light from the optical read/write head. If the guide device according to the invention is placed in a position which corresponds approximately to that of the cylindrical guide member in the known device, then during transport from one reel via the guide member to the other reel the tape will nevertheless, despite the oscillatory movement of the guide member, come each time into contact with the guide member, even if only very briefly, and thus be subjected to some friction and wear against the guide member. In order to reduce further any friction between the tape and the guide member, it is preferable for the position where the tape passes the guide body to lie, at least approximately, at the point of intersection of the two imaginary lines which are tangent to the core of the one reel and to the outermost turn of the other reel, which is fully wound. Since this point of intersection of the two imaginary lines will change position only very slightly during the complete winding of the tape from one reel to the other, it is thus ensured that the tape will be pushed in the direction of the guide member only by a very slight and usually negligible transverse tape tension component. The friction and hence the wear between the tape and the guide member is therefore greatly reduced.

In view of the fact that for reasons of manufacture the guide member must have certain minimum dimensions, it is preferable for the shape of the guide member to be so selected that the portion of the guide surface which can come into contact with the tape is reduced to a relatively small area. It is therefore preferable for the sliding member to be provided with a relatively small central area, viewed in the direction of movement of the tape, at right angles to the direction of the oscillatory movement, together with adjoining side surfaces which extend at right angles to the tape movement plane and are at such an angle to said central area that the information carrier tape does not make contact with these surfaces or extends approximately parallel thereto.

In a particularly simple form of construction of the apparatus, the sliding member consists of a piezoelectric member of such shape and construction that when a predetermined voltage is applied the sliding member will make the desired oscillatory movement. Through precise selection of the shape, frequency and amplitude of this predetermined voltage, the movement of the sliding member can be controlled as desired.

In another embodiment, the sliding member is at least partly made of magnetizable material, and the device is provided with an electromagnetic or magnetic field generator by which the sliding member can be set in vibration.

The embodiments discussed above are intended solely for achieving a smooth and uniform tape transport movement along the guide member. However, the device according to the invention may also be used for stopping the movement of the tape temporarily during a shorter or longer period, for example in order to read or write a determined piece of information on the tape. A device according to the invention which is provided with this facility for stopping the tape is characterized in that on the other side of the tape stop means are provided, and that the aforesaid field generator or the piezoelectric member can be so controlled that the sliding member can be stopped in a position in which the sliding member is held against the stop means, with the tape clamped therebetween. Although separate means, for example in the form of projecting wall parts or separate members can be used as stop means, it is preferable, particularly when an electromagnetic or magnetic field generator is used, for the field generator to be provided with pole shoes which extend, on one side of the information carrier tape, in the direction of the sliding member which is situated on the other side of the information carrier tape, Between these pole shoes a window is provided through which the information carrier tape can be read or written, and which can serve as a stop means.

When a sliding guide member is used which has a relatively small central area and adjoining side surfaces which form an angle with said central area, as was indicated above, it is preferable for the end surfaces of the pole shoes to lie at right angles to the band movement plane, opposite said adjoining side surfaces of the sliding member, in such a manner that the surfaces lying opposite one another enclose a predetermined small angle. With this form of construction of the pole shoes on the one hand, and of the sliding member on the other hand, a certain centering action is achieved for the sliding member in relation to the pole shoes of the field generator. In view of the fact that, depending on dimensions, the end surfaces of the pole shoes may make more or less extensive contact with the tape, it is preferable for the edges of the pole shoes to be rounded. However, the pole shoes come into contact with that side of the information carrier tape on which no information carrying structure is provided, so that contact between the pole shoes and the tape does not result in any wear of the information carrying structure of the tape.

The invention relates not only to a device of the above-described type, but in addition also relates to a holder or cassette for an information carrier in tape form which is provided with two tape reels and also provided with a tape guiding device of this kind. The invention further relates to a device in which a holder or cassette of this type can be placed for further use, which device is then provided with an optical read/write head and also with an electromagnetic or magnetic field generator.

BRIEF DESCRIPTION OF DRAWINGS

The invention will be described more fully with reference to the accompanying drawings, in which:

FIG. 1 shows schematically one example of a sliding guide member and tape according to the invention.

FIG. 2 shows one form of construction of a sliding guide member according to the invention, which member is set in oscillatory motion with the aid of an adjacent electromagnetic field generator.

FIG. 3 shows an example of a tape holder or cassette in which the guide device according to the invention is used.

FIG. 4 is a schematic diagram showing the position of the sliding member in the cassette shown in FIG. 3.

FIG. 5 is a detail view of the device used in the cassette shown in FIG. 3.

DESCRIPTION OF INVENTION

FIG. 1 shows very schematically a section taken through an information carrier 1 in tape form which is transported along a guide member 2 in the direction of the arrow 3. During this transport of the tape 1, the guide member 2 makes an oscillatory movement relative to the tape, which in FIG. 1 is indicated by the double arrow 4.

The oscillatory movement of the sliding guide member 2 can for exmple be achieved by making the sliding member entirely or partially of a piezoelectric material, on which are disposed contacts which can be connected to a suitable voltage source for producing the desired movement. Constructions of this kind are in particular suitable for use a guide members along which a tape can change direction.

It is however also possible for the sliding guide member 2 to be made at least partially of a magnetizable material and for the part so made to be coupled to the magnetic circuit of an electromagnetic or magnetic field generator in such a manner that the part of the sliding member and thus the sliding member as a whole can be caused to perform the desired oscillatory vibrations when the field generator is controlled accordingly. A possible form of construction for an arrangement of this kind is shown in FIG. 2.

That part of the sliding guide member 11 which is shown in FIG. 2 is made of a magnetizable material and is situated in the magnetic circuit of the yoke 12 of the field generator. The yoke 12 is in addition provided with an electric coil 13, which by means of the terminals 14 and 15 can be connected to a suitable voltage source. As can be seen in FIG. 2, the two ends of the yoke 12 are positioned on one side of the tape 10, and the sliding member 11 is situated on the other side of the tape 10. However, arrangements in which both the field generator and the sliding guide member are disposed on the same side of the tape 10 also come within the scope of the invention.

Even without more detailed consideration of the voltage forms to be applied, it will be clear that by correct excitation of the field generator 12 and coil 13, it will be possible for the sliding member 11 to be alternately attracted by the field generator in the upward direction in FIG. 2, whereby the top part of the tape 10 will be displaced in the upward direction. Then with no attractive force applied by the field generator, the sliding member 11 will move together with the band 10 through the action of the transverse component of the tension existing in the tape 10 and/or through the return action of the stop member (the pole shoes 12 in FIG. 2). Although in this case a certain contact will be made with the sliding member 12 throughout such movement, the forces occurring are extremely slight. Only during the relatively brief upward displacement movement of the sliding member 11 could there be any friction and therefore wear between the sliding member 11 and the tape 10.

FIG. 3 shows very schematically a tape cassette for which only the side wall 20 is shown in section. The cassette contains two reels 21 and 22, which are mounted in known manner (not shown) for rotation in the cassette. The tape 24 is wound on the reels. The outer turns of the respective parts of the tape on the reels 21 and 22 are indicated schematically by a broken circular line. FIG. 3 also shows the sliding member 25 along which the tape 24 is moved, together with a three-part member 26 forming part of the field generator. FIG. 5 shows further details of the member 26 and the field generator. In FIG. 3 it is only shown that the side wall of the cassette is provided at the top with an indentation in which the member 26 is fastened, for example by adhesive bonding. The space in the side wall of the cassette is used to receive the end of the actual field generator as shown in FIG. 5, in such a manner that this field generator can be coupled to the member 26.

In FIG. 3 the sliding member 25 is not positioned, as in known arrangements, near one of the longer sides of the cassette, but is moved inwards in relation thereto. The selection of this position will be explained with reference to FIG. 4. FIG. 4 shows schematically two reels 30 and 31 which are provided with respective cores 32 and 33. The reels are fastened rotatably in fixed positions relative to one another similarly as for the tape cassette shown in FIG. 3. When one of the reels, for example the reel 30, is fully wound and the other reel 31 is empty, the tape will run between the two reels in the position as indicated by the line 34. If on the other hand the reel 30 is empty and the reel 31 fully wound, the path of the tape will be as indicated by the line 35. The point of intersection of the two lines 34 and 35 is designated 36. During the winding of the tape from one reel to the other, this intersection point 36 will scarcely change position. It is therefore preferable for the sliding member 25 to be positioned in the proximity of this point 36, because in that location the transverse tape tension component which results in the tape and the sliding member being pressed one against the other will be very slight, and thus result in minimum wear of the tape against the sliding member.

FIG. 5 shows further details of the sliding member 25, the member 26 and the field generator coupled to member 26. In FIG. 5 the two parts of the cassette side wall which are visible are designated 40 and 41. Between the ends of these parts of the cassette wall there is disposed an arrangement of yoke end sections 42 and 43 and a window 44 transparent to light. The yoke end sections 42 and 43 come into contact with the parts 45 and 46 respectively of the field generator yoke when the cassette is coupled to the electromagnetic or magnetic field generator, this yoke being inserted from outside into the recess in the side wall of the cassette until the coupled position shown in FIG. 5 is reached.

The sliding guide member 47 is positioned in accordance with the principle discussed regarding FIG. 4, and guides the tape between the reels, which are not shown in FIG. 5. The cooperation between the yoke of the field generator and the sliding member 47 will require no further explanation in view of the explanations already provided above.

The parts 42, 43 and 44 are for example fixed with the aid of a suitable adhesive to the ends of the wall parts 40 and 41 of the cassette. By way of the window 44 which is transparent to light, light can pass from the top side in FIG. 5 onto the tape 48, or at least onto that part of the tape which is situated on the upper surface of the sliding member 47. As can be seen in FIG. 5, this sliding member has next to its central surface two side surfaces adjoining the central surface and extending at an angle therewith. The angle of these side surfaces is so selected that the tape 48 never touches these surfaces and at most runs parallel to them, so that any wear on the lower face of the tape carrying the information against these surfaces will be avoided.

During fast forward winding and rewinding of the tape between the reels, which are not shown in FIG. 5, it is preferable to avoid any contact with the sliding member 47. For this purpose the field generator is disconnected, so that through the action of the transverse tape tension component and possibly through that of gravity the sliding member 47 will be moved in the direction of a member 49, which is provided with a recess on the side facing the sliding member 47. This member 49 serves to limit the permissible movements of the sliding member 47.

It may be advantageous for at least the central area of the sliding member 47 to be made of or to be coated with a wear-resistant material having a low co-efficient of friction. The end surfaces of the pole shoe sections 42 and 43, or at least their edges which can come into contact with the tape 48, may also advantageously be made of or coated with wear-resistant material having a low coefficient of friction. It will be understood that movements of the sliding member 47 in directions at right angles to the plane of the drawing are limited by the top and bottom surfaces of the cassette or by parts projecting therefrom.

In view of the fact that it is possible for static charges to build up on the tape 48 and to have a detrimental effect on the uniform movement of the tape, it is preferable for at least a part of the sliding member 47 which comes into contact with the tape and also regularly comes into contact with other sliding parts 47 of the cassette, to be made of an electrically conductive material. It will thus be possible for any electric charges present in the tape 48 to be rapidly and effectively removed.

I claim:

1. A device for guiding an information carrier which is in tape form and moves between two reels, the device being situated in the path of tape transport between the two reels and being in the form of a guide member along which the tape is moved with a tape tension, wherein the guide member is a non-rotatable sliding member adapted to oscillate in a direction at right angles to the local direction of movement of the tape, said sliding member having a maximum acceleration which is at least five times greater than the transverse force component of the tension divided by the mass of that part of the tape which is affected by the sliding member, and the place where the tape moves past the sliding member is situated at least approximately at the point of intersection of two imaginary lines which are tangent to the core of one said reel and to the outermost turn on the other said reel which is fully wound with the tape.

2. A device according to claim 1, wherein said number of times is greater than ten.

3. A device according to claim 1, wherein the mass of the guide member and the maximum acceleration and frequency of the oscillatory movement are selected so that the maximum deflection of the sliding member between the end positions of the oscillatory movement will be smaller than 5 μm.

4. A device according to claim 1, wherein the sliding member is provided with a relatively small central area, viewed in the direction of movement of the tape at right angles to the direction of the oscillatory movement, together with adjoining side surfaces which extend at right angles to the tape movement plane, and are at such an angle to said central area that the information carrier tape does not make contact with these surface or extends approximately parallel thereto.

5. A device according to claim 1, wherein the sliding member consists of a piezoelectric member having such shape and construction that when a predetermined voltage is applied the sliding member will make a desired oscillatory movement relative to the tape.

6. A device according to claim 1, wherein said field generator is provided with pole shoes which extend on one side of the information carrier tape, in the direction of the sliding member which is situated on the other side of the information carrier tape, while between said pole shoes a window is provided through which the information carrier tape can be read or written and which can serve as stop means.

7. A device according to claim 6, wherein the end surfaces of the pole shoes lie opposite said adjoining side surfaces of the sliding member in such a manner that the surfaces lying opposite one another enclose a predetermined small angle.

8. A device according to claim 1, wherein the sliding member is provided, at least in said central area, with a wear-resistant top layer.

9. A device according to claim 1, wherein the sliding member can be moved to a release position in which no further contact is made with the information carrier tape.

10. A device according to claim 1, wherein at least those parts of the sliding member which can come into contact with the information carrier tape are made of metal and the metal parts of the sliding member are in electrical contact with a grounded part of the frame of the device.

11. A device for guiding an information carrier which is in tape form and moves between two reels, the device being situated in the path of tape transport between the two reels and being in the form of a guide member along which the tape is moved with a tape tension, wherein the guide member is a non-rotatable sliding member adapted to oscillate in a direction at right angles to the local direction of movement of the tape, said sliding member having a maximum acceleration which is at least five times greater than the transverse force component of the tape tension divided by the mass of that part of the tape which is affected by the sliding member, wherein the sliding member is at least partly made of magnetizable material, and the device is provided with an electromagnetic or magnetic field generator by which the sliding member can be set in vibration.

12. A device according to claim 11, wherein on the tape other side a stop means is provided and said field generator or the piezoelectric member can be so controlled that the sliding member can be stopped in a position in which the sliding member is held against the stop means, with the tape being clamped therebetween.

13. A holder for an information carrier tape, which holder is provided with a casing containing two tape reels and a device for guiding the information carrier tape between the two reels, the device comprising a guide member which is a non-rotatable sliding member adapted to oscillate in a direction at right angles to the local direction of movement of the tape, said sliding member having a maximum acceleration which is at least five times greater than the transverse force component of the tape tension divided by the mass of that part of the tape which is affected by the sliding member, and the place where the tape moves past the sliding member is situated at least approximately at the point of intersection of two imaginary lines which are tangent to the core of one said reel and to the outermost turn on the other said reel which is fully wound with the tape.

14. A holder according to claim 13, wherein the holder is provided with pole shoe parts which are mounted in a wall of the holder cassette and which after the cassette has been coupled to an external electromagnetic or magnetic field generator form part of the magnetic circuit of the generator.

15. A holder according to claim 14, wherein one side wall of the holder cassette is provided with an indentation which is open towards the outside, and in which the electromagentic or magnetic field generator can be inserted from outside in such a manner that the magnetic circuit of the generator is functionally coupled to the guide member through the cassette wall.

16. A holder according to claim 13, wherein the holder is provided with hermetically sealed electrical lead-in members for supply of an exciting signal to the piezoelectric member.

* * * * *